(12) United States Patent
Larsen

(10) Patent No.: US 6,328,363 B1
(45) Date of Patent: Dec. 11, 2001

(54) DEVICE FOR HANDLING DISCS, SUCH AS CDS

(75) Inventor: Tommy Larsen, Ry (DK)

(73) Assignee: Tommy Larsen A/S, Ry (DK)

( * ) Notice: Subject to any disclaimer, the term of this patent is extended or adjusted under 35 U.S.C. 154(b) by 0 days.

(21) Appl. No.: 09/651,025

(22) Filed: Aug. 30, 2000

Related U.S. Application Data

(63) Continuation of application No. PCT/DK00/00046, filed on Feb. 4, 2000.

(30) Foreign Application Priority Data

Feb. 5, 1999 (DK) .......................................... PA 1999 00154

(51) Int. Cl.[7] .................................................. B25J 15/06
(52) U.S. Cl. .......................................................... 294/64.1
(58) Field of Search ...................................... 294/1.2, 64.1; 29/743, 758; 248/362, 363; 269/21; 271/94, 96, 103; 279/3

(56) References Cited

U.S. PATENT DOCUMENTS

| | | | | |
|---|---|---|---|---|
| 762,499 | * | 6/1904 | Sprague | 294/64.1 |
| 897,060 | * | 8/1908 | Cash | 294/64.1 |
| 1,251,258 | * | 12/1917 | Magill | 294/64.1 X |
| 2,303,393 | * | 12/1942 | Schmidt | 294/64.1 |
| 2,783,018 | * | 2/1957 | Lytle | 294/64.1 X |
| 2,910,264 | * | 10/1959 | Lindenberger | 294/64.1 X |
| 3,230,002 | * | 1/1966 | Olson | 294/64.1 |
| 3,240,525 | * | 3/1966 | Wood | 294/64.1 |
| 3,627,188 | | 12/1971 | Horne | 226/200 |
| 4,214,785 | | 7/1980 | Broch | 294/64 R |
| 4,583,343 | * | 4/1986 | Camp | 294/64.1 X |
| 4,593,947 | | 6/1986 | Yocum | 294/64.1 |
| 5,201,913 | | 4/1993 | Vliet | 294/64.1 |
| 5,511,752 | | 4/1996 | Trethewey | 248/205.9 |

FOREIGN PATENT DOCUMENTS

| | | | |
|---|---|---|---|
| 1966112 | * 7/1971 | (DE) | 294/64.1 |
| 32 13 635 | 10/1983 | (DE) | . |
| 43 04 937 | 8/1994 | (DE) | . |
| 890551 | 11/1943 | (FR) | . |
| 2 375 004 | 7/1978 | (FR) | . |
| 2511921 | * 3/1983 | (FR) | 294/64.1 |
| 2 750 910 | 10/1998 | (FR) | . |
| 219144 | * 5/1968 | (SU) | 294/64.1 |
| 1135710 | * 1/1985 | (SU) | 294/64.1 |

* cited by examiner

Primary Examiner—Johnny D. Cherry
(74) Attorney, Agent, or Firm—Jacobson Holman, PLLC

(57) ABSTRACT

A device for handling light objects, such as CDs, with one hand without the objects being touched with the hand, the device having one or more suction parts configured for inspiration against a plane face of the object and a gripper configured for being seized and secured with one hand. A flexible elastomer body is provided at the gripper which is configured for complete or partial filling and emptying of a void in order to produce, via one or more communication passages, a sub atmospheric pressure between the suction parts and the plane face of the objects upon abutment and inspiration by the device against the object.

18 Claims, 9 Drawing Sheets

DEVICE FOR HANDLING DISCS, SUCH AS CDS

This application is a con't of PCT/DK00/00046 filed Feb. 4, 2000.

BACKGROUND OF THE INVENTION

1. Field of the Invention

The present invention relates to a device for handling light objects with one hand only without touching said objects with one's hand, said device comprising one or more suction parts configured for inspiration against a plane face of said object and a gripping means configured for being seized and held with one hand and where a movable piston body comprising a flexible, elastomer body is arranged at the gripper for complete or partial filling and emptying of a void for providing, via one or more connecting passages, a sub atmospheric pressure between the suction parts and the plane face of the object upon abutment and inspiration against the object.

2. Description of the Related Art

Devices of this type are used to seize and handle a variety of objects, such as CDs or CD-ROMs that may suffer damage when handled directly. When handled directly, deposition of dust, saline perspiration and other kinds of pollution may occur from the surface of fingers, which is harmful to many different types of surfaces. It is a particular problem especially in connection with the handling of CDs and CD-ROMs that their removal from ordinary cassettes for storing the discs is extremely difficult due to the gripping means that secure the CDs in their central holes being released only with difficulty which means that the CDs must be twisted or broken loose from the cassette which may have the practical consequence that it is necessary to touch and optionally scratch or soil the surface of the CDs which is both extremely delicate and intolerant of precisely such scratches or soil since this may entail a poor reproduction of the tracks of the CD.

Such devices are known in which the suction elements are resilient whereby a light pressure against a plane face enables them to be firmly inspired there against. It may present a problem when such suction cup is to be let go when the object is to be released and in reality it is not possible to regulate the inspiration pressure. If more separate suction cups are used, complex devices are required to ensure that they let go of the surface simultaneously. In another type of prior art suction cups, a central part of the suction cup can be withdrawn upon abutment against the surface to create the requisite sub atmospheric pressure. In these prior art devices it will be very difficult—and involve an extremely complex construction—to configure the suction cups such that they have, to a very large extent, the shape of the objects to be seized by the relevant device.

Thus, FR patent application No 2750910 discloses a suction device for handling eg CDs, which suction device comprises a plurality of flexible suction cups that are connected via passages to a common ventilation opening. The ventilation opening is located such that the operator can close the opening by use of a finger. Hereby it is possible to press the suction device against the surface of a CD following which the operator closes the opening with his finger and thereby the elastic lips on the suction device will, due to its resilient abutment on the surface of the CD, form a sub atmospheric pressure that secures the CD to the suction device. However, it is a problem of such lifting devices that the CDs often have surfaces with pictures and the like printed thereon which may prevent the lips of the suction device from engaging completely sealingly with an ensuing risk that the CD is dropped after a relatively short time. It is a further problem that the prior art suction cups are to be pressed against the CD while applying a certain amount of force to inspire properly, and this is undesirable, it being most often the case that the CD is to be lifted from a drawer in a CD-player which is relatively fragile and does not readily tolerate a downward pressure.

Prior art document FR patent application No 2750910 further discloses a device which comprises one or more suction parts configured for inspiration against a plane face of the object, and a gripper configured for being seized and secured with one hand only, and where a movable piston body comprising a flexible, elastomer body which is arranged at the gripper for complete or partial filling and emptying of a void for providing, via one or more connecting passages, a sub atmospheric pressure between the suction parts and the plane face of the object upon abutment and inspiration against the object.

In order to release the object, the sub atmospheric pressure must be equalised, and according to the prior art, and this is done by applying further pressure to the piston body. This however is not always enough to equalise the pressure, as the suction parts may have become deformed during the inspiration process, and said deformation may cause a certain sub atmospheric pressure to prevail even when the elastomer body is fully depressed. In this case, the CD is stuck with the device.

SUMMARY OF THE INVENTION

In the light of this, it is the object of the invention to provide a device for handling light objects wherein the sub atmospheric pressure in the suction means can be established in a simple manner, without necessitating that the suction cup has to be pressed against the object to be lifted, and where the objects lifted may at any time be safely released by equalizing the sub atmospheric pressure with the pressure of the surrounding environment.

This is obtained by a device of the kind described above wherein a service means is provided for a valve for establishing a connecting passage between the environment and the area between the suction parts and the plane face of the object for equalising the sub atmospheric pressure for releasing the object, and where said valve is configured underneath the elastomer body, whereby the service means is configured for being operated under influence of pressure through the elastomer body. The piston body makes it possible in a simple manner, eg by means of a finger not used for abutment on the gripper portion, to provide a well-defined sub atmospheric pressure in the void, and via connecting passages to transmit this sub atmospheric pressure to the area between the suction elements and the plane face of the object. In reality, the piston body and the void constitute a pump that imparts the sub atmospheric pressure to the suction cups, and by use of a central pump separated from the suction cups, it is possible to regulate the pressure in a simple manner in a single or more separate suction cups.

When the valve is located underneath the dome-shaped elastomer body and is configured for operation by pressure through the elastomer body, it is accomplished that the valve is within reach of a finger, irrespective of where the device is seized, and furthermore the valve will be hidden which contributes to maintaining a pleasant appearance.

A simple and readily operable device is obtained if the piston body is surrounded by the gripper in the form of an annular flange, whose outside is configured for abutment with fingers. In that case, the flange can be secured to the outside between two fingers, e.g., the thumb and the middle finger, in which case the index finger is used to operate the piston body.

The suction cups themselves can conveniently have a course that extends around the central area. In that case, the suction cup can form an annular region or can be constituted by one or more kidney-shaped parts. Hereby a relatively large suction area is obtained compared to the total area of a CD or any other item covered by the device.

Particularly in connection with CD-discs it has been found to be convenient if the abutment parts of the suction cups comprise lips that each have a small linear contact with the plane face of the item upon inspiration. The surface pressure on the contact faces between lips and CD is thereby high, and this contributes to preventing air from being drawn in between lips and CD.

However, it is also possible to configure the suction cups of the device, whose abutment parts comprise lips that each have a wide and flexible contact face with the plane face of the object upon inspiration.

BRIEF DESCRIPTION OF THE DRAWINGS

The invention will now be described in further detail with reference to the accompanying drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
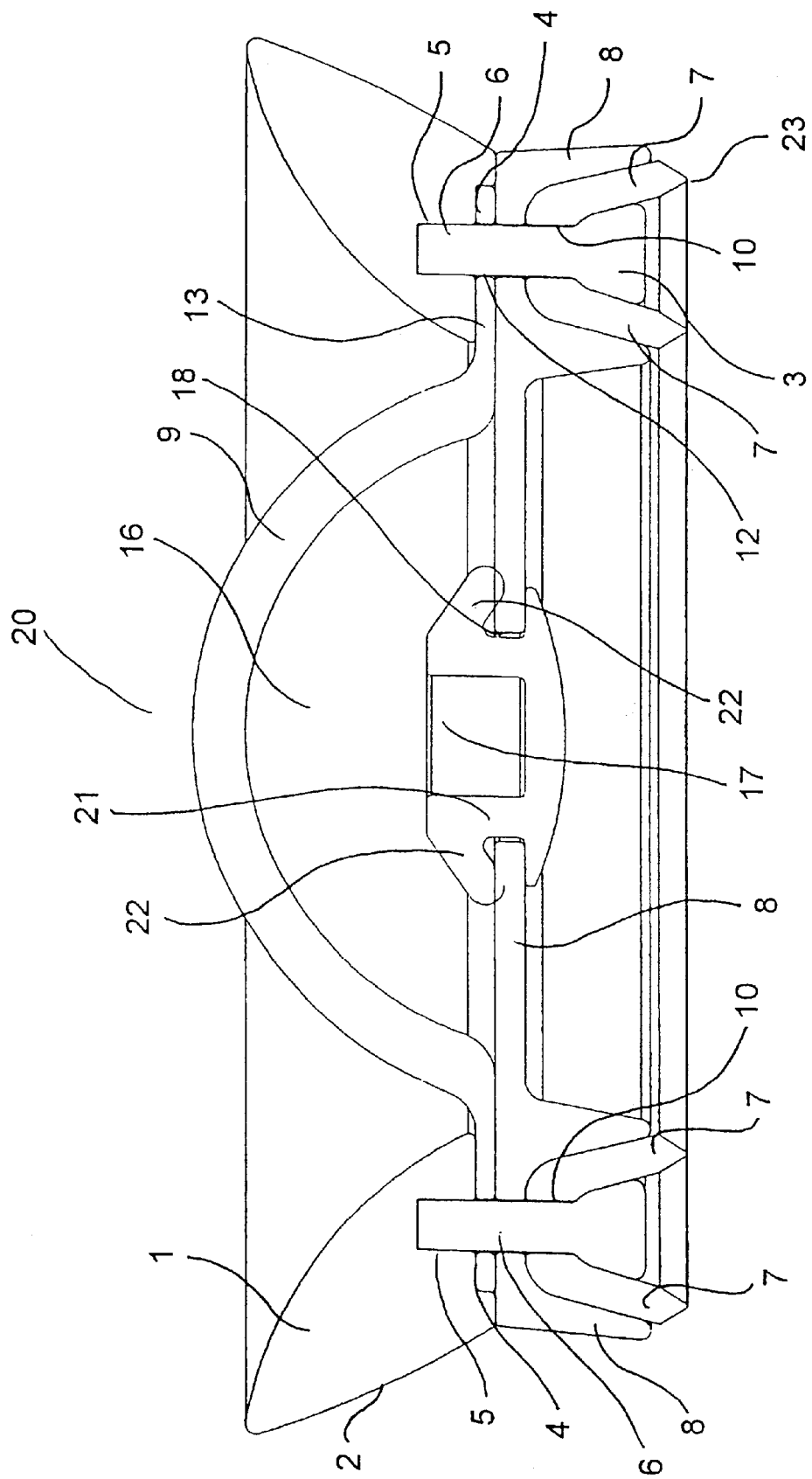
FIG. 1 is a sectional view through an embodiment of the device according to the invention.

Now FIG. 1 illustrates an exemplary device 20 in accordance with the present invention wherein there is a gripper having an annular flange portion 1 with an external, essentially conical engagement face 2. In the underside 4 of the flange portion, openings are configured that match the upright pins 6 of an annular assembly element 3. Between the flange element 1 and the assembly element 3, three separate elements are secured, viz the lip parts 7 defining the suction ring, and openings 11 and 12 in the bottom element 8 and an outwardly oriented flange element 13 accompanying the dome-shaped element 9, respectively. A suitable connection has been established between the pins 6 and the flange portion 1, e.g., by gluing, welding, or a snap fitting. The bottom element 8 has external and internal, annular, downwardly protruding flanges that engage around the lip portion 7 and the assembly element 3 located between the two lips.

Figure 3:
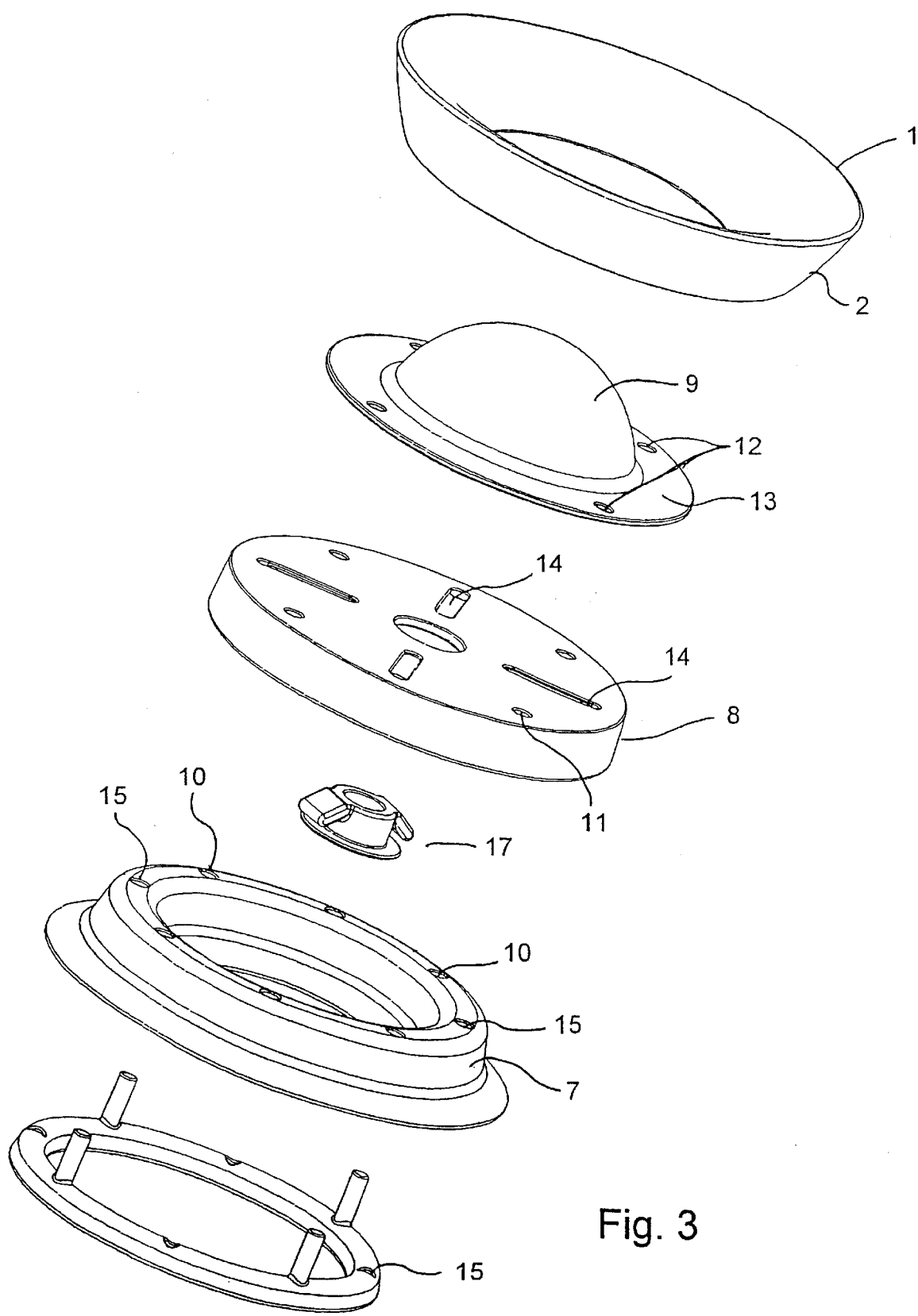
FIG. 3 is a reproduction corresponding to FIG. 2 featuring, however, an alternative embodiment seen in an inclined view from above.
Figure 4:
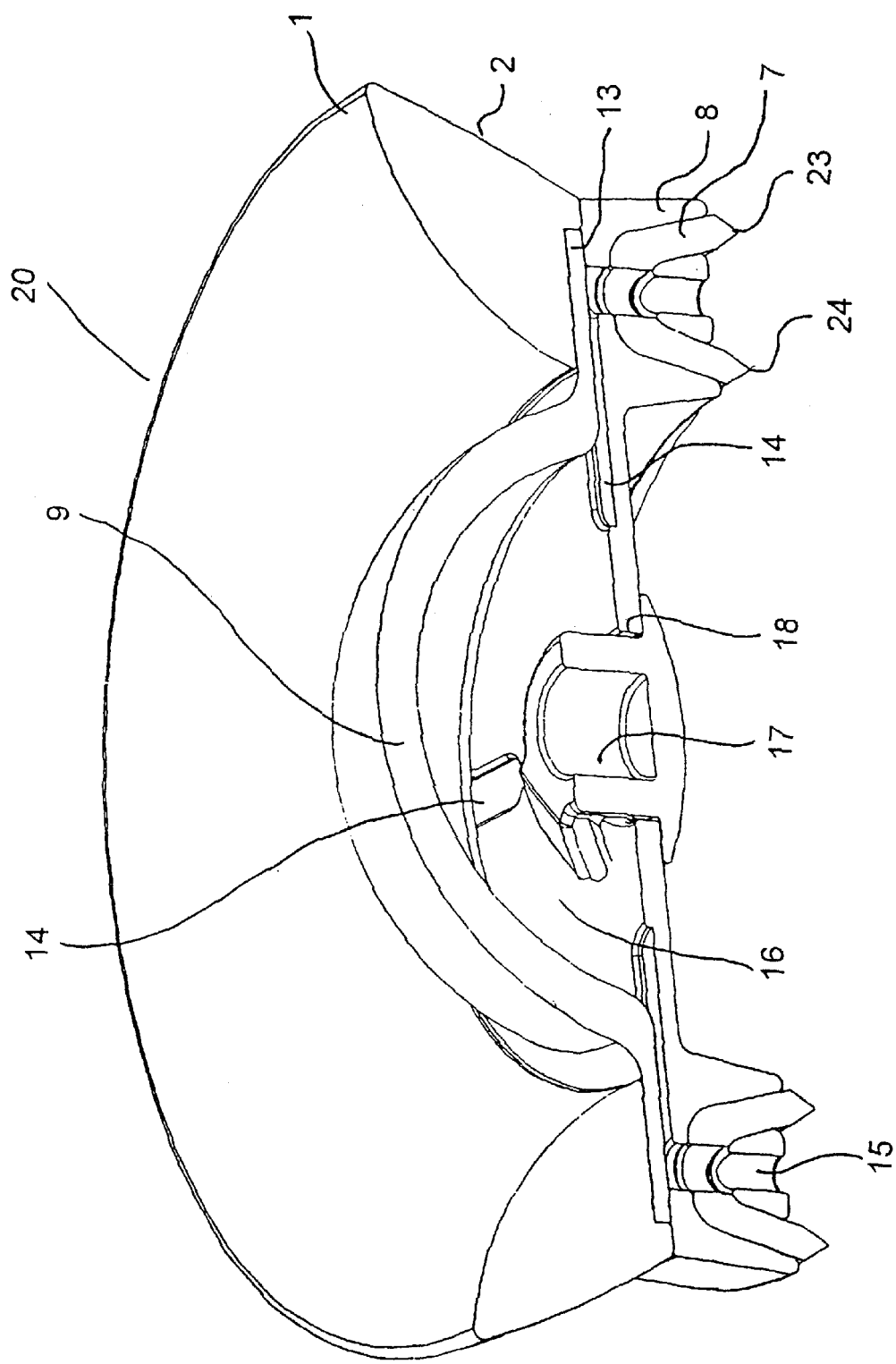
FIG. 4 is a perspective reproduction of the device shown in sectional view in FIG. 1.

As will appear from FIGS. 3 and 4, the top face of the bottom element 8 comprises grooves 14 that form connecting passages for holes 15 that extend through the assembly element 3, the lip portions 7 and the bottom element 8. Between the bottom element 8 and the dome-shaped element 9, a void 16 is delimited that will, via the passages 14 and the openings 15, be in communication with the area below the lip parts 7.

If the gripper is now positioned on eg a CD-disc in such a manner that the lips enclose the central opening of the disc; and if the dome-shaped elastic element is pressed downwards, the void 16 is emptied partially of air, and when the element 9 is released and attempts to assume its original shape, a sub atmospheric pressure will be established in the void 16. The sub atmospheric pressure is transmitted via the passages 14 and the openings 15 to the area underneath the lips 7, and thereby the gripper is sucked firmly towards the disc that can now be handled without contact with fingers, and the CD can eg be lifted out of a cassette and positioned in a CD-player.

In order to remove the existing sub atmospheric pressure in the void, a valve 17 is provided in a central opening 18 in the centre face of the bottom element 8. The valve 17 is made of a relatively flexible material and has a bearing surface 19 that abuts on the underside of the bottom element 8 around the opening 18. The valve 17 has a central portion 21 that extends upwards through the opening 18, and at the top of the central potion 21 there are abutment means 22 that extend downwards towards the top face of the bottom element and that will, by resilient abutment there against, ensure that an abutment pressure is maintained between the bearing face 19 of the valve and the underside of the bottom element 8.

When the valve element is exposed to pressure from above through the dome-element the abutment means 22 will yield resiliently, and the abutment pressure in the bearing face is increased and via the play between the central portion 21 and the opening 18 a sub atmospheric pressure, if any, in the void 16 can be neutralized, and an object sucked firmly against the underside of the lips 7 is released.

Figure 2:
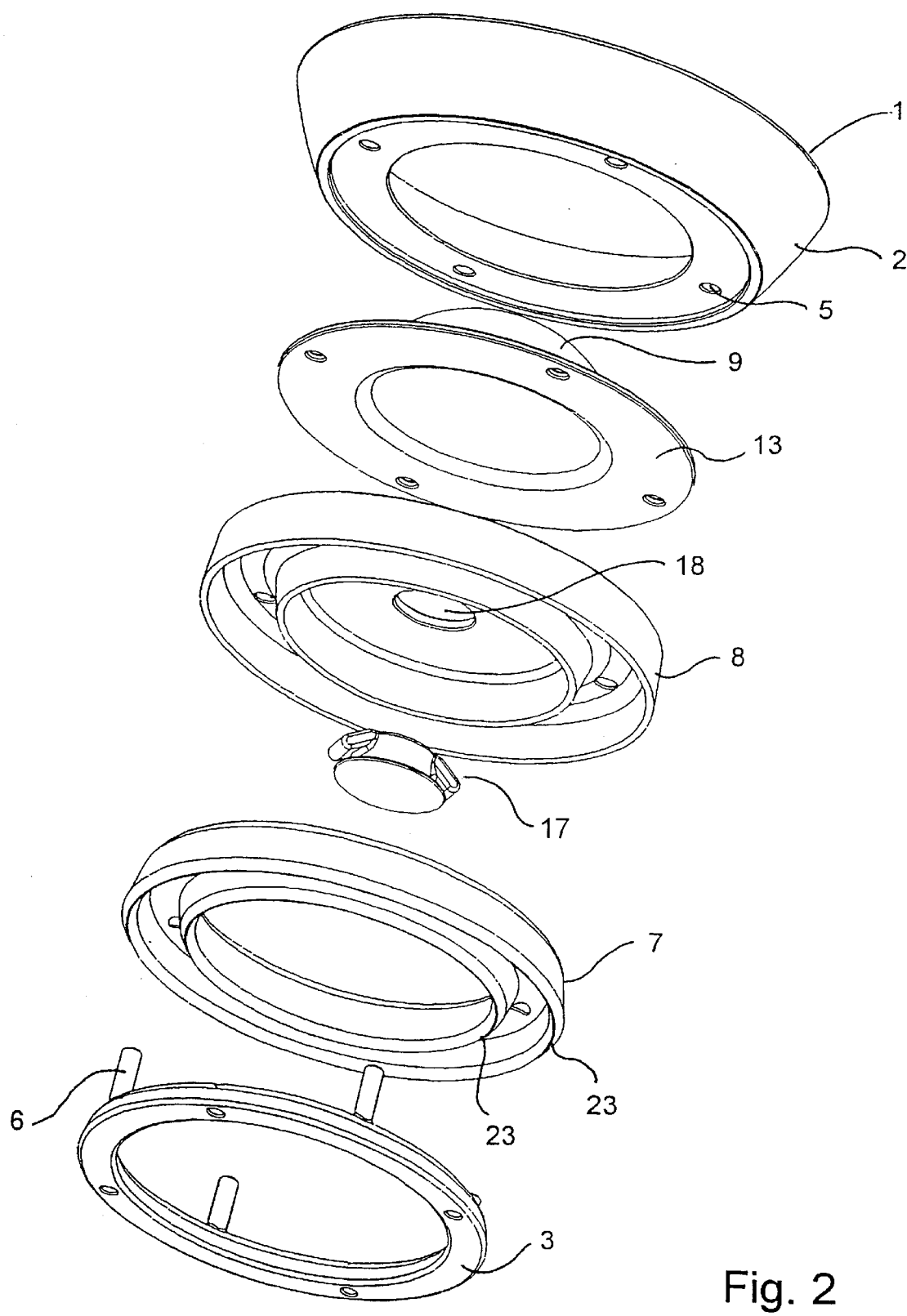
FIG. 2 is an exploded view of the device shown in FIG. 1, seen in inclined perspective from below.

In FIGS. 1, 2 and 4, an embodiment is shown wherein the lips are configured with narrow linear abutment faces 23. Hereby it is ensured, even in the case of a weak sub atmospheric pressure, that the surface pressure between the abutment faces on the lips and on the CD becomes fairly high. This has been found to be advantageous in that it ensures attachment of a CD against the lips, even in case certain inevitable irregularities are present in its surface, e.g., due to the applied advertisement or information print on the top face of the CD. In FIGS. 1, 2, and 4, lips 7 with a V-shaped section are shown wherein the tip of the V forms the abutment line. The pointed ends of the lips 7 mean that to some extent the material is capable of following the irregularities in the surface formed by the printing matter by the pressure on the CD.

Figure 5:
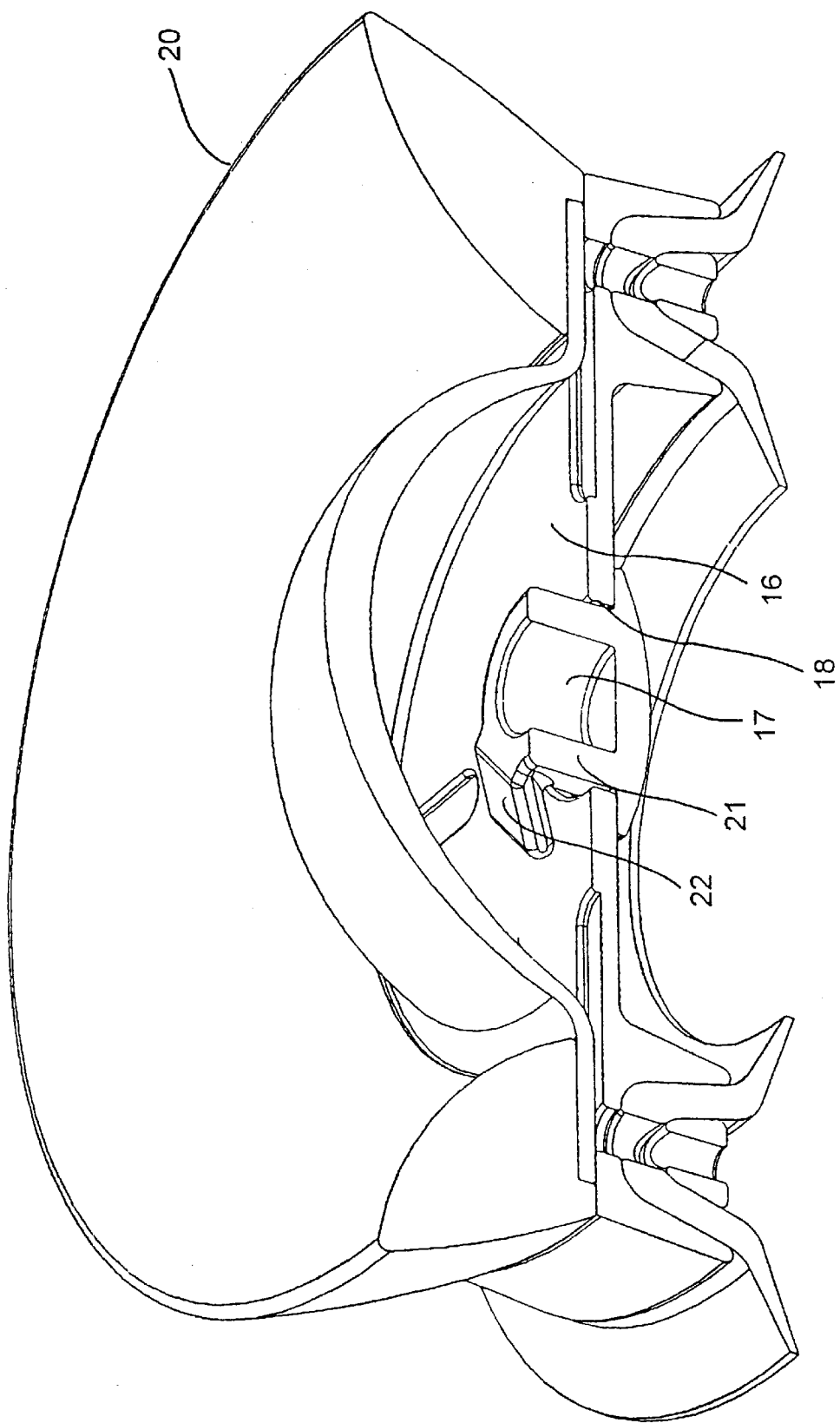
FIG. 5 is a reproduction corresponding to FIG. 4 of the embodiment shown in FIG. 3.
Figure 6:
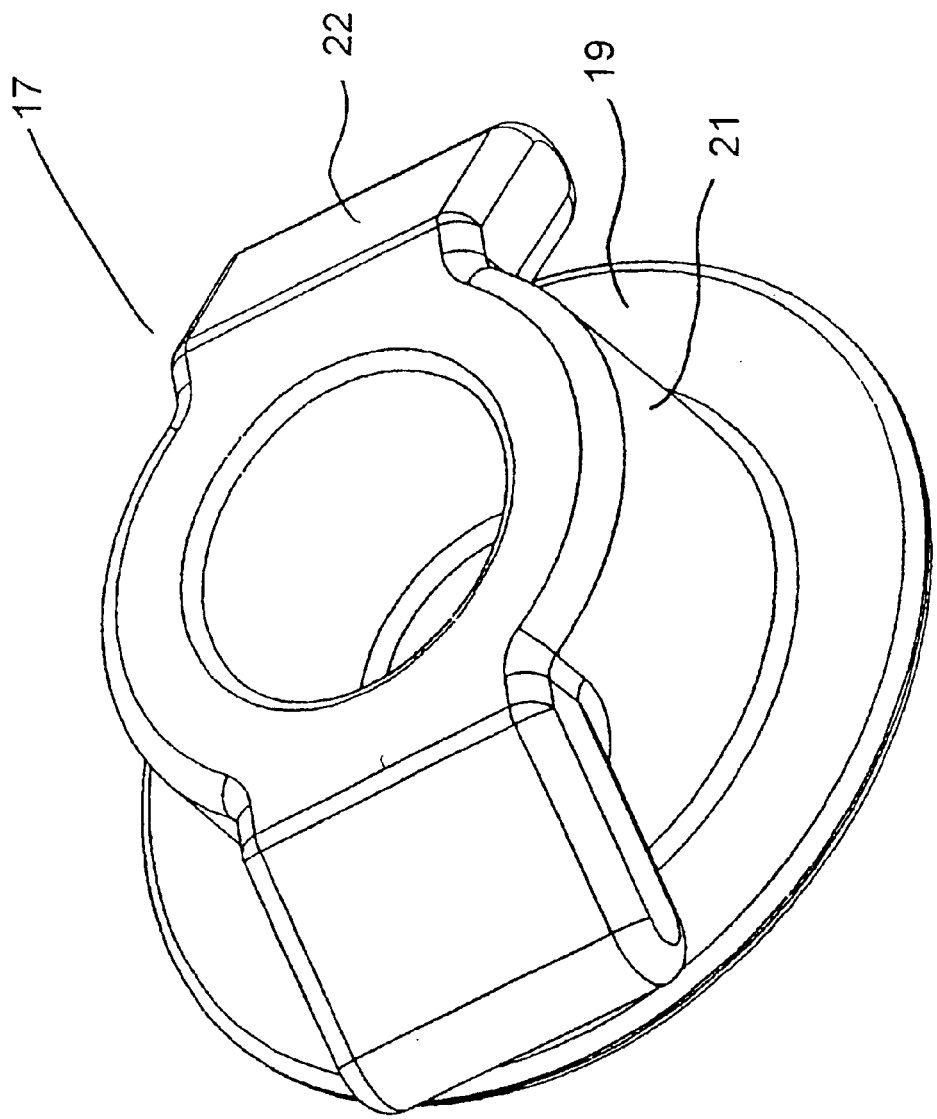
FIG. 6 is an enlarged sectional view of an exemplary valve element in accordance with the invention.

FIGS. 3 and 5 disclose an exemplary embodiment of the suction cups with usual wide abutment faces. They will be suitable if the object seized is not completely planar, the resilient lips still being capable of following the surface of the object.

The embodiments shown in FIGS. 1 through 5 are configured with two concentric lips 7 that abut on the surface of the CD. However, the present invention can also be configured in another way, as is outlined eg in FIGS. 7 and 8 that show the configuration of the abutment faces in two alternative embodiments of the invention.

Figure 7:
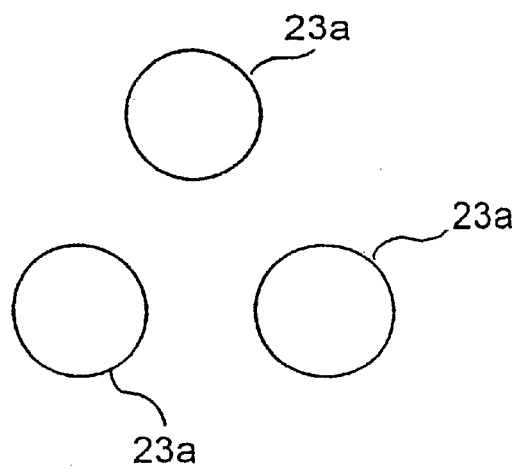
FIG. 7 is a schematic view of an alternative embodiment of the suction area of a device in accordance with the invention.

Thus, FIG. 7 shows that the suction areas can be delimited by a plurality of annular, circular abutment faces 23a. According to a not shown, alternative embodiment the circular abutment faces can be replaced by other annular, convex shapes, such as elliptic abutment faces.

Figure 8:
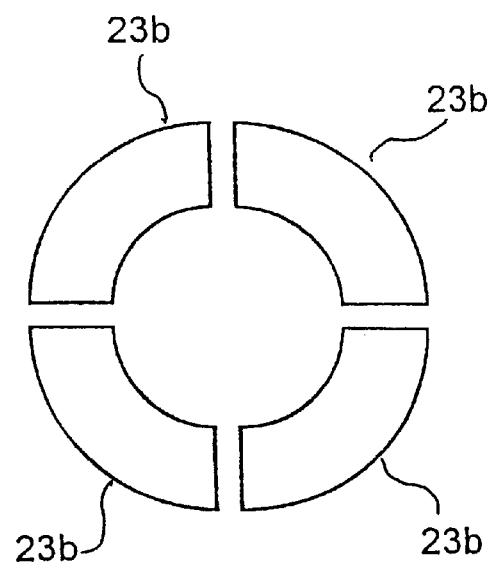
FIG. 8 is a schematic view of a second alternative embodiment of the suction area on a device according to the invention.

Now FIG. 8 illustrates a further alternative embodiment, wherein a plurality of kidney-shaped suction areas delimited by the abutment faces 23b are configured instead.

Figure 9:
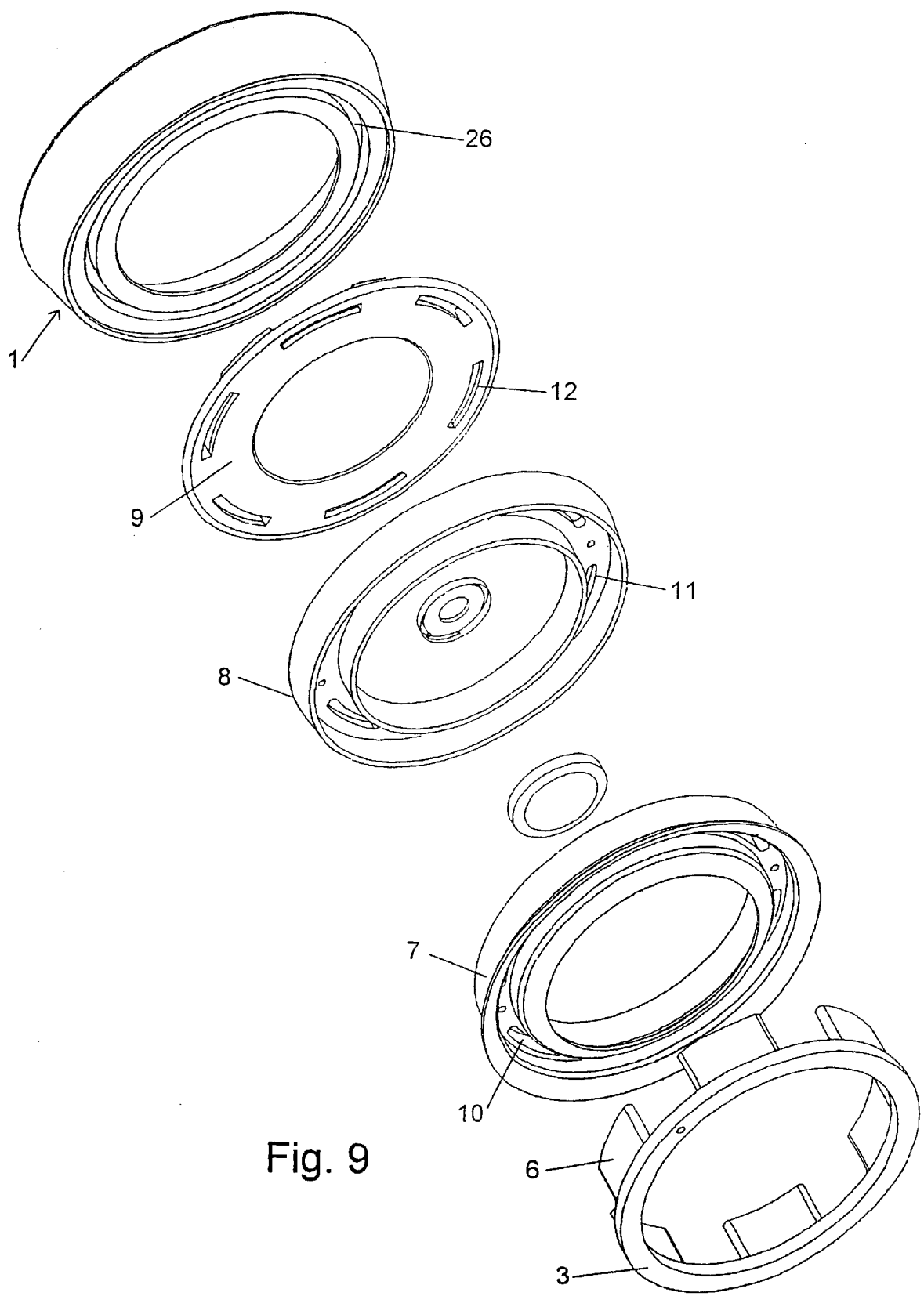
FIGS. 9 and 10 display a further alternative embodiment of the invention.
Figure 10:
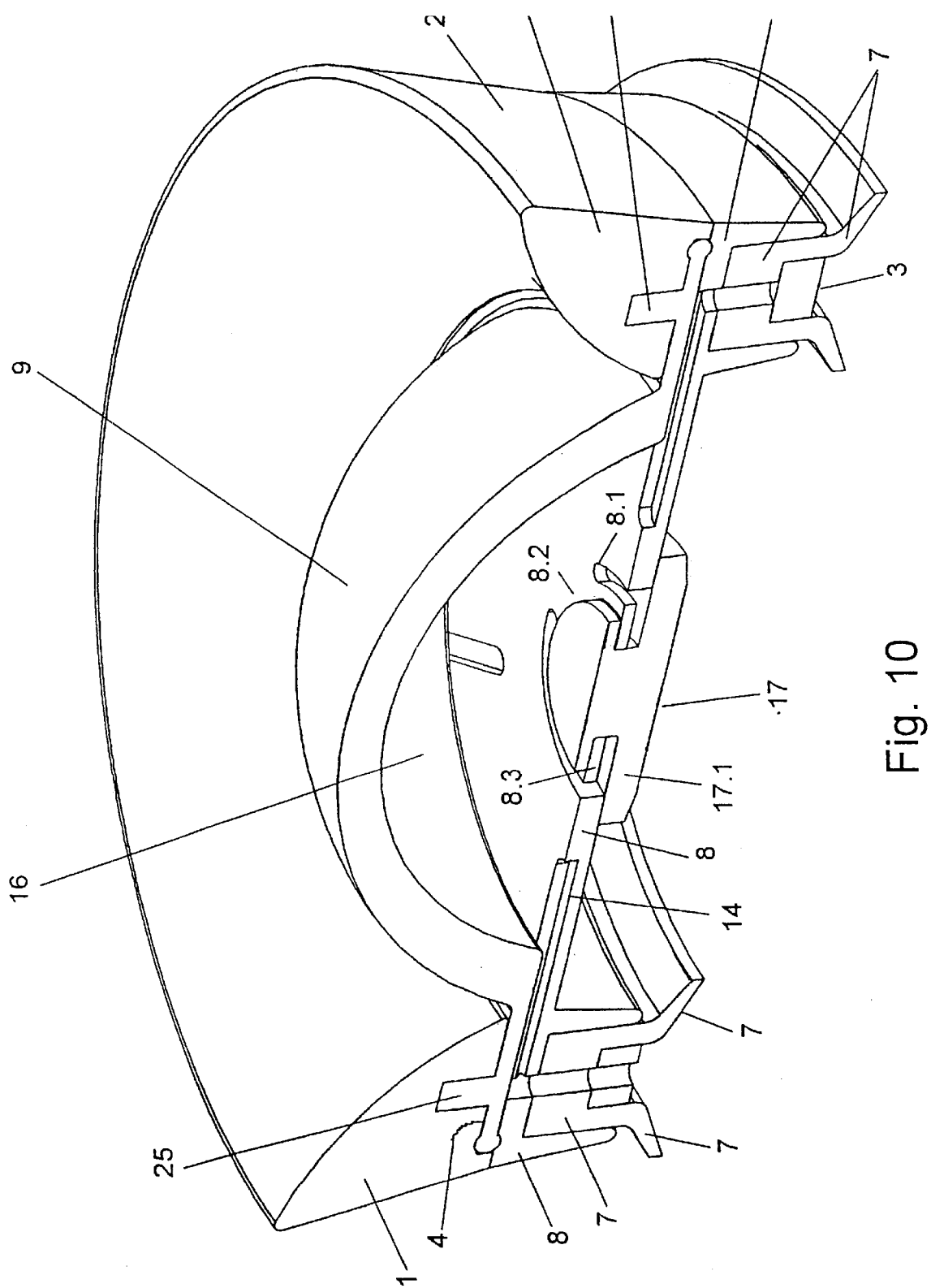

FIGS. 9 and 10 illustrate a further embodiment of the present invention in which the gripper has annular ring recess 26 for receiving protrusion 25 on the flange of elastomeric body 9. A central portion of bottom element 8 includes cutout portions 8.1, 8.2, 8.3, and valve 17 includes bearing surface 17.1. The remaining elements have been previously identified.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for handling light objects with one hand only without touching the objects with one's hand, said device comprising:
    at least one suction part configured for inspiration against a plane face of the object, said suction part comprising an annular suction ring delimited by two separate annular lips extending around a central area of the device for abutment with said object;
    a gripper having a shape that allows it to be seized and secured with one hand only;
    a flexible, elastomer body connected to the gripper, said elastomer body for at least partially filling and emptying a void to provide, via at least one connecting passage, a sub atmospheric pressure to an area between the suction ring and the plane face of the object upon abutment of said lips and inspiration of said device against the object; and
    a valve arranged for establishing a connecting passage from the central area under the device to the area between the suction ring and the plane face of the object for equalizing the sub atmospheric pressure to release the object, said valve being positioned underneath the elastomer body and being operable by pressure through the elastomer body.

2. The device according to claim 1, wherein the elastomer body is surrounded by the gripper which has a form of an annular flange with an outside that is configured for finger-abutment.

3. The device according to claim 1, wherein said lips each have a wide and flexibly resilient contact face with the plane face of the object.

4. A device according to claim 1, wherein the elastomer body is dome-shaped within the gripper and has an outwardly extending flange, said flange extending between the annular gripper and a bottom element, said valve being provided in the bottom element.

5. The device according to claim 4, said valve having a bearing surface that abuts an underside of said bottom element around a central opening in said bottom surface, a central portion that extends upward through said central opening, and abutment members that extend downward from said central portion toward a top face of said bottom element.

6. A device according to claim 4, wherein the suction ring is secured between an underside of the bottom element and an assembly element located between the two lips of the suction ring.

7. A device according to claim 6, wherein the assembly element has a number of upright pins arranged to extend through openings in the suction ring, in the bottom element, and in the outwardly extending flange of the elastomer body, said pins being connected to an underside of the gripper.

8. The device according to claim 1, wherein the object is a CD.

9. The device according to claim 1, wherein the sub atmospheric pressure is limited to said area between the suction ring and the plane face of the object, said central area under the device remaining at atmospheric pressure.

10. A device for handling light objects having a centrally located through-going opening without touching the objects with one's hand, said device comprising:
    at least one suction part configured for inspiration against a plane face of the object, said suction part comprising an annular suction area delimited by inner and outer sealing lips which form concentric rings extending around a central area of the device for abutment with said object;
    a dome-shaped elastomer body for at least partially filling and emptying a void located beneath the dome to provide, via at least one connecting passage, a sub atmospheric pressure to said annular suction area between said inner and outer sealing lips and the plane face of the object upon abutment of said lips and inspiration of said device against the object; and
    a valve for establishing a connecting passage from the central area under the device to said annular suction area for equalizing the sub atmospheric pressure to release the object, said valve being positioned underneath the elastomer body and being operable by pressure through the elastomer body.

11. The device according to claim 10, wherein the elastomer body is surrounded by a gripper having an annular flange with an outer surface that is configured for finger-abutment.

12. The device according to claim 11, further comprising a bottom element located beneath the void and an assembly element, said suction part secured between an underside of said bottom element and said assembly element, said assembly element fitted between said inner and outer lips.

13. A device according to claim 12, wherein the elastomer body has an outwardly extending flange extending between the annular gripper and the bottom element, said valve being provided in the bottom element.

14. A device according to claim 13, wherein the assembly element has a number of upright pins arranged to extend through openings in the suction part, in the bottom element, and in the outwardly extending flange of the elastomer body, said pins being connected to an underside of the gripper.

15. The device according to claim 12, said valve having a bearing surface that abuts an underside of said bottom element around a central opening in said bottom surface, a central portion that extends upward through said central opening, and abutment members that extend downward from said central portion toward a top face of said bottom element.

16. The device according to claim 10, wherein said lips each have a wide and flexibly resilient contact face with the plane face of the object.

17. The device according to claim 10, wherein the object is a CD.

18. The device according to claim 10, wherein the sub atmospheric pressure is limited to said annular suction area between the lips and the plane face of the object, said central area under the device remaining at atmospheric pressure.

\* \* \* \* \*